United States Patent
Hansen (10) Patent No.: US 9,747,780 B2
(45) Date of Patent: Aug. 29, 2017

(54) METHOD AND SYSTEM OF A VEHICLE FOR SENDING AN EMERGENCY CALL SIGNAL

(71) Applicant: Harman Becker Automotive Systems GmbH, Karlsbad (DE)

(72) Inventor: Lars Hansen, München (DE)

(73) Assignee: HARMAN BECKER AUTOMOTIVE SYSTEMS GMBH, Karlsbad (DE)

(*) Notice: Subject to any disclaimer, the term of this patent is extended or adjusted under 35 U.S.C. 154(b) by 0 days.

(21) Appl. No.: 14/173,150

(22) Filed: Feb. 5, 2014

(65) Prior Publication Data

US 2014/0232571 A1   Aug. 21, 2014

(30) Foreign Application Priority Data

Feb. 20, 2013 (EP) .................................... 13000862

(51) Int. Cl.
   *G08B 25/10* (2006.01)
   *H04W 4/22* (2009.01)
   *H04W 4/04* (2009.01)

(52) U.S. Cl.
   CPC .............. *G08B 25/10* (2013.01); *H04W 4/22* (2013.01); *H04W 4/046* (2013.01)

(58) Field of Classification Search
   CPC ...... G08B 25/10; H04W 48/18; H04W 4/046; H04W 4/22; H04W 76/007
   USPC .......... 340/435, 436, 438, 989, 506; 701/45, 701/29.1, 31.5
   See application file for complete search history.

(56) References Cited

U.S. PATENT DOCUMENTS

| | | | |
|---|---|---|---|
| 6,311,124 B1 | 10/2001 | Maeda et al. | |
| 6,889,137 B1* | 5/2005 | Rychlak | G01C 21/3407 340/286.07 |
| 7,233,795 B1* | 6/2007 | Ryden | 455/445 |
| 2004/0021583 A1* | 2/2004 | Lau et al. | 340/995.19 |
| 2006/0187017 A1* | 8/2006 | Kulesz et al. | 340/506 |

(Continued)

FOREIGN PATENT DOCUMENTS

| | | |
|---|---|---|
| DE | 102008039831 A1 | 3/2009 |
| EP | 0978706 A2 | 2/2000 |

(Continued)

OTHER PUBLICATIONS

European Search Report for Application No. 13000862.6, dated Oct. 15, 2013.

(Continued)

*Primary Examiner* — Hongmin Fan
(74) *Attorney, Agent, or Firm* — Artegis Law Group, LLP (57) ABSTRACT

Techniques for automatically sending an emergency signal by means of a system of a vehicle are provided. According to one technique, an emergency situation is detected by evaluating signals of a number of sensors. A current position of the vehicle then determined, and a plurality of entries of emergency response services are received. A minimum cost is determined from the costs associated with respective entries of the plurality of entries to the current position of the vehicle, and a first-priority entry is determined from the minimum cost. An address for sending the emergency call signal is received, where the address is included in the first-priority entry. The retrieved address is used to start a setup of a connection to a device of the emergency response service.

11 Claims, 3 Drawing Sheets

(56) References Cited

U.S. PATENT DOCUMENTS

| | | | |
|---|---|---|---|
| 2008/0143497 A1* | 6/2008 | Wasson | G08B 25/001 |
| | | | 340/425.5 |
| 2009/0261958 A1* | 10/2009 | Sundararajan et al. | 340/436 |
| 2010/0284382 A1 | 11/2010 | Staehlin et al. | |
| 2011/0287733 A1* | 11/2011 | Cepuran | H04W 76/007 |
| | | | 455/404.1 |

FOREIGN PATENT DOCUMENTS

| | | | | |
|---|---|---|---|---|
| JP | 2006330894 | * | 12/2006 | G08B 25/04 |
| WO | 2012/100826 A1 | | 8/2012 | |

OTHER PUBLICATIONS

Rapp, Peter M. et al: "Technical and Organizational Basis for eCall in Switzerland", Forschungsauftrag VSS 2007/903 auf Antrag der Vereinigung Schweizerischer Strassenfachleute (VSS), Mar. 2009, pp. 22-24, 46, 63-65, 69.

\* cited by examiner

METHOD AND SYSTEM OF A VEHICLE FOR SENDING AN EMERGENCY CALL SIGNAL

The present invention relates to a method and a system of a vehicle for sending an emergency call signal.

A system is known from "Grundlagen für eCall in der Schweiz" (Basis for eCall in Switzerland), research paper VSS 2007/903, March 2009, which includes automatic and/or manual alarms, a precise position indication as well as the ability to contact the vehicle occupants involved in the accident, and also includes rapid alerting of the emergency response team so that help arrives more quickly at the site of the accident and the team is better prepared than before for the accident. At the press of a button, the driver is connected to a telephone information service. In addition to information about the traffic situation and destination, etc., the system also includes an automatic emergency call in which the location as well as vehicle data are forwarded to the dispatch center. As soon as an impact of a certain intensity occurs, the system automatically transmits an emergency call, which is immediately forwarded from the control center to the nearest rescue control center, including the exact vehicle position. A voice connection is also set up. In addition to providing assistance in the event of accidents, the system may also be used for vehicle breakdowns or other malfunctions. The system currently requires an infrastructure which is not standardized in every country or is not even available at all.

DE 10 2008 039 831 A1 relates to a network-based emergency call device for a vehicle. A first connection is permanently set between the vehicle and a server as a permanent IP connection. This connection is used to send an emergency call to the server, along with the necessary emergency call data. The server forwards the emergency call to all registered assistance units over further connections directly and without any human action. The assistance unit providing assistance is selected automatically by the emergency call being accepted by an assistance unit. When a communication link is subsequently set up between the accepting assistance unit and the vehicle, the existing IP connection between the vehicle and server is used for the communication link to be set up. The data to be sent and the data rate may furthermore be adapted to the current situation of the vehicle and to the surroundings of the vehicle.

EP 0 978 706 A2 discloses a method and system for generating a navigation route. Techniques have been developed for constructing a route which is the most desirable according to predetermined optimization criteria. The map database is comprised of route segments, each segment connecting two endpoints or intersections. One widely used method for determining an optimal route is the Dijkstra method, wherein each route segment in the map database has an associated cost. The total cost of various potential routes between the current location and the destination are calculated and compared so that a route may be selected with the lowest overall cost.

The object of the present invention is to provide a method for sending an emergency call signal by means of a system of a vehicle which does not require a control center or central server for sending the emergency call signal.

This object is achieved by a method having the features of the independent claim 1. Advantageous refinements are subject matter of dependent claims and included in the description.

Accordingly, a method for automatically sending an emergency signal by means of a system of a vehicle is provided. The method may have one or more steps specified below.

Detecting an emergency situation by evaluating signals of a number of sensors;

Determining a current position of the vehicle by means of a position determining unit of the system;

Retrieving a plurality of entries of emergency response services from a database after the detection of the emergency situation;

Ascertaining a cost for each entry of the plurality of entries to the current position of the vehicle by means of a processor of the system;

Determining a minimum of costs;

Determining a first-priority entry, wherein the first-priority entry is determined from the minimum of costs;

Retrieving an address included in the first-priority entry for sending the emergency call signal; and Starting a setup of a connection to a device of the emergency response service by means of the retrieved address.

Many advantages may be achieved by a specific embodiment, as shown, for example, in the exemplary embodiments in the figures. By employing a database within the vehicle, the system may use different types of connections and may automatically select the associated connection address. An emergency signal may thus be sent even in countries where no Internet connection is available, for example due to the lack of a provider, or where emergency control centers are missing.

A further object of the invention is to provide a system of a vehicle which is improved for automatically sending an emergency signal.

This object is achieved by the system having the features of the independent claim 8. Advantageous refinements are included in the description.

A system of a vehicle may be provided for sending an emergency signal.

The system may have an interface for connecting a number of sensors for detecting an emergency situation. The emergency situation may be detected based on signals of the number of sensors.

The system may have a position determining unit for determining the current position of the vehicle.

The system may have a database for retrieving a plurality of entries of emergency response services.

The system may have a transceiver.

The system may have a processor. The processor may be connectable to at least one of the transceiver and the database and the position determining unit and the interface.

The processor may be configured to determine a cost to the current position for each entry among the plurality of entries. The determination may be initiated by the detection of the emergency situation. The cost may be determined for each retrieved entry between the current position of the vehicle and position data in said entry.

The processor may be configured to ascertain a minimum of costs.

The processor may be configured to determine a first-priority entry among the plurality of entries from the minimum of costs.

The processor may be configured to retrieve an address included in the first-priority entry for sending the emergency call signal.

The processor may be configured to start a setup of a connection to a device of the emergency response service by means of the retrieved address.

The transceiver unit may be configured to send the emergency call signal via the connection.

The refinements described below relate to both the method and the system. Features of the method and function features of the system are derivable from each other.

Crash sensors and/or smoke sensors for detecting the emergency situation may be connected to the system via the interface. The connection may be a separate sensor signal cable or a data bus. The position determining unit may be designed to determine the current position of the vehicle. The current position may be determined by means of radio signals, such as signals of base stations of a mobile communications network or radio signals of satellites (e.g. GLONASS, GPS, Galileo).

The database can be part of a navigation function of the system which might enable the user to store personal addresses of the user, such as email addresses or telephone addresses. The data for each emergency response service may be stored in the database in the form of metadata. The entries may be read out automatically, initiated by the detection of the emergency situation.

The ascertained costs may form the time that a rescue team requires to reach the current position of the vehicle from the emergency response service. If the fact, that the emergency response service sends an ambulance, is stored in the entry, the system may determine the time it takes for the ambulance to arrive at the current position of the vehicle by means of a route calculation. If a rescue helicopter is available, on the other hand, this helicopter may reach the current position more rapidly, so that the cost may be ascertained based on a straight-line distance. Additional factors may also affect the cost, for example a ferry or national border or impassable roads in the event of a disaster. In case of the route calculation, the cost of the route may be made up as a summation of the costs of the individual segments of the route. To ascertain the minimum of costs, the cost for each entry may be compared with each other or with a threshold. Additional costs may be caused by the type of emergence response service and/or the type of emergency situation detected.

The system may start setting up the connection automatically without a user input being necessary. The receiving address may be a fixed network number or a mobile number or a fax number or an email address or the like. For this purpose, the receiving address may be read out from the database and may be used to set up the connection. It is also possible to read out multiple receiving addresses from one entry and to set up a connection for each of the multiple receiving addresses and to send corresponding emergency signals over the established connection in parallel or sequentially.

In one embodiment, the plurality of entries may be a subset of a superset of entries for emergency response services. The plurality of entries may be obtained by filtering entries from the superset. The filtration may be carried out based on an evaluation of the sensor signals and/or the current position of the vehicle and/or a user input command. A fire in the vehicle may be detected by means of a smoke sensor, and the filter for ascertaining a fire station may be set as the emergency response service. The country in which the vehicle is located may be ascertained based on the current position of the vehicle, and only the entries for emergency response services in the same country may pass through the filter.

In one embodiment a route and corresponding cost and/or flight distance and corresponding cost may be calculated for the plurality of entries. The flight distance may only be calculated if a corresponding service (helicopter rescue) is available.

According to one embodiment, a first route in a road network may be determined at least for a first entry and a second route in a road network may be determined for a second entry. The road network may be stored in the system, or the system may access the road network over an online connection. The minimum of costs may be determined by comparing first cost for the first route and second cost for the second route. First and second costs may be compared with each other or with one or more thresholds to determine the minimum. Additionally one or more further routes and further costs of the number of entries may be calculated and compared. The comparison may provide a prioritization of the routes.

In one embodiment each cost may be determined based on a risk factor. The risk factor may depend on traffic congestion, transport availability and the like.

In one embodiment, a signal format of the emergency signal may be determined based on an identifier included in the first-priority entry or second-priority entry. The identifier may be included, for example in the receiving address or may be derived therefrom. The signal format may be a text format and/or an image format and/or an audio format or the like. Only an audio format may be used as the signal format for a conventional telephone network number being the receiving address. In this case an audio voice message may be read from a memory or generated by a processor. The generated voice message may contain a description of the current position of the vehicle in the local language, including the additional information when an emergency situation has occurred and possibly the sensed type of emergency situation involved. The audio voice message may be sent to the device of the emergency response service of the corresponding database entry.

According to one embodiment, the entries for the emergency response services may be updated in the database by means of a memory or with the aid of a network connection to a server. The system may have a data interface such as a USB interface via which the entries may be updated by the user or a service station—for example, for whole Europe—. The entries may also be updated online. This may take place automatically each time the system starts and/or cyclically—e.g., once a day—and/or depending on the position—for example when approaching a national border—and/or based on a user input command and/or triggered by a connected server if the local version in the system is older.

In one embodiment, a second-priority entry may be ascertained in addition to the first-priority entry. Accordingly, the second-priority entry may have a lower priority for setting up a connection to a device of an emergency response service. The second-priority entry may be determined based on cost and may be the closest to the minimum. A further setup of a further connection to a further device of an emergency response service in the second-priority entry may be started for sending the emergency call signal if the setup of the connection to the receiving device of the emergency response service in the first-priority entry is unsuccessful. A further setup of a further connection to a device of an emergency response service in the second-priority entry may be started for sending the emergency signal if an acknowledgement message is not received within a predetermined time limit from the device of the emergency response service in the first-priority entry. A third-priority entry and, if necessary, a fourth-priority entry may be ascertained accordingly. This may be continued until a connection is established or all entries will have been checked.

The refinement variants described above are advantageous individually as well as in combination. All refinement variants may be combined with each other. Some possible combinations are explained in the description of the exemplary embodiments in the figures. However, these possibilities illustrated therein for combining the refinement variants are not exhaustive.

The invention is explained in greater detail below on the basis of exemplary embodiments illustrated in the drawings, where.

Figure 1:
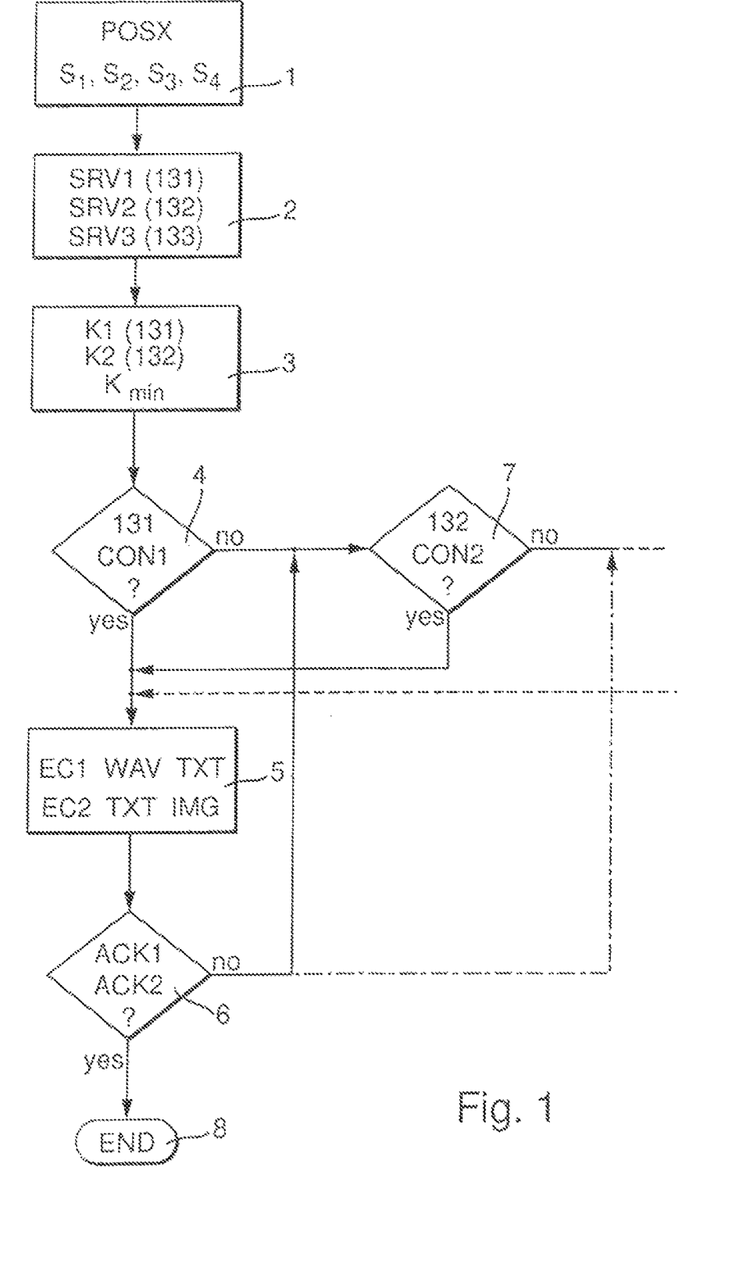
FIG. 1 shows a schematic flow chart of a sequence.

FIG. 1 shows a method sequence which includes method steps 1, 2, 3, 4, 5, 6, 7 and 8 in the form of a schematic flow chart. The method sequence in FIG. 1 may be carried out in processor 140 of a system 100 of a motor vehicle 10, as this system 100 is displayed schematically by way of example in FIG. 2. System 100 is, for example, a navigation system which is provided, for example, as a so-called head unit in vehicle 10.

In the first step 1 of FIG. 1, a current position POSX of vehicle 10 may be determined. A number of sensor signals $S_1$, $S_2$, $S_3$, $S_4$ may also be evaluated in first step 1. An emergency situation may be detected on the basis of the sensor signals $S_1$, $S_2$, $S_3$, $S_4$. If an emergency situation is detected, a plurality of database entries 131, 132 may automatically be determined in second step 2. Each entry 131, 132 in the plurality of entries 131, 132 may be associated with one of the emergency response services 41, 42. Accordingly, the plurality of entries 131, 132 may be determined after the emergency situation is detected. An interaction with the user is not required. Emergency response services 41, 42 may be configured in order for an emergency response team to rush to rescue the occupant of the vehicle 10, for example with the aid of emergency vehicles or helicopters.

In addition, the sensor signals $S_1$, $S_2$, $S_3$, $S_4$ may be evaluated to ascertain a type of emergency situation by means of the processor 140. The processor 140 may be referred as arithmetic unit. For example, a fire may be detected as the type of the emergency situation with the aid of a smoke or heat sensor. If system 100 is able to detect the type of emergency situation involved, it is possible to filter an associated emergency response service such as a hospital, police or fire department.

The filtration may filter out a subset 131, 132. The plurality of entries 131, 132 may thus be the subset of a superset of entries 131, 132, 133 for the emergency response services. Accordingly, the plurality of entries 131, 132 may automatically be determined for filtration on the basis of the number of sensor signals $S_1$, $S_2$, $S_3$, $S_4$. For this purpose, service data SRV1, SRV2, SRV3 of each entry 131, 132, 133 may be evaluated in step 2 of the exemplary embodiment in FIG. 1, the service data SRV1, SRV2, SRV3 may define the scope of the emergency assistance of the emergency response services. The emergency response services may be a Patient Transport Ambulance (abbr.: PTA) or fire fighting service.

Additional filters may also be used to determine the plurality of entries 131, 132. The filtration may be carried out on the basis of a country identifier, the plurality of entries 131, 132 for the country in which vehicle 10 is located passing through the filter. For example, the plurality of entries 131, 132 for the current state and/or postal code in which vehicle 10 is located may be filtered out on the basis of a regional identifier. In addition, other filters, such as office hours of an emergency response service, etc., may be used. This filtration may avoid alerting an emergency response service which is not responsible for the situation or an emergency response service in a neighboring country. If no responsible emergency response service is determined, the filter set in that case may also be automatically deleted.

If the plurality of entries 131, 132 is determined with the aid of filtration, entry 131 of the emergency response service which may be able to provide assistance the fastest and/or the most reliably may be ascertained in subsequent third method step 3. The fastest or most reliable assistance may be ascertained by so-called cost. The cost may usually be used to determine an optimum route under given circumstance. In the exemplary embodiment in FIG. 1, the cost between a geographic location of the relevant emergency response service and current position POSX of vehicle 10 may be determined. The travel time of a fire department vehicle from the location of the emergency response service to the position of the vehicle POSX along a route may be determined as the cost. The route calculation may already be part of the navigation function of system 100. Current traffic conditions, such as blockages or congestion, may be taken into account. If a rescue helicopter is used, on the other hand, the cost may be the straight-line distance between vehicle position POSX and the location of the emergency response service having a helipad.

A first-priority entry 131 from among the plurality of entries 131, 132 associated with a minimum $K_{min}$ of costs $K_1$, $K_2$ may determined in third step 3. The particular cost $K_1$, $K_2$ up to current position POSX of vehicle 10 may determined for each entry 131, 132 in the plurality of entries 131, 132. To determine the minimum $K_{min}$, costs $K_1$, $K_2$ may be compared with each other, for example with the aid of a greater than/less than comparison.

A setup of a connection CON1 to a receiving device of the emergency response service in first-priority entry 131 may be started in fourth step 4. The connection may be set up with the aid of a receiving address included in the first-priority entry 131. The connection may be set up according to a telephone or fax connection. To send an e-mail, a connection may be set up to the provider. After the connection is set up, the emergency call signal may be sent. In countries where the rescue system may be less well developed, an emergency response service may not always be manned. If an emergency response service of this type is not reached within a period of time, system 100 automatically sends an emergency signal EC2 to the next emergency response service, if the latter is reachable. The sequence may be repeated until a connection CON1, CON2 may be set up to an emergency response service.

If the connection setup is therefore successful, a fifth step 5 may take place. If the connection setup for the first-priority entry 131 fails, on the other hand, a seventh step 7 may be carried out. In seventh step 7, a lower-priority entry 132 may be read out, and a setup of a connection CON2 to a receiving device of the emergency response service in the lower-priority entry 132 may be started. The lower-priority entry 132 may be a second-priority entry 132 having next higher cost $K_2$ compared to the first-priority entry 131. If the setup of connection CON2 in second entry 132 is successful, again fifth step 5 with changed address parameter may follow. If the setup of connection CON2 for the second entry 132 is unsuccessful, for example a connection setup for a again lower-priority entry (third priority—not illustrated) may be started. The query for the again lower-priority entry (not illustrated) may be inserted into the flow chart, which is indicated by the dotted line.

In fifth step 5, an emergency call signal EC1 or EC2 may be sent via an established connection CON1 or CON2 (depending on address parameter). Emergency signal EC1, EC2 may have different signal formats. Emergency call signal EC1, EC2 may have an audio file WAV and/or a text file TXT and/or an image file IMG and/or a video file and/or a geoposition as the signal format. Image file IMG and/or the video file may show surroundings of vehicle 10. Audio file WAV may include spoken text which describes the current position POSX on the basis of map data such as street names or the like. Text file TXT may be an e-mail or SMS text message which may describe the current position of the vehicle and the type of emergency situation. Signal format WAV, TXT, IMG (voice/microphone recording/text/image) of the emergency signal EC1, EC2 may be selected automatically on the basis of an identifier in entry 131, 132, by determining the signal format on the basis of the address, a telephone number or mobile number or fax number or e-mail address, and reading out the associated file. Also the type of emergency response service (police, ambulance, hospital, fire brigade, etc.) may be taken into account.

In one embodiment in FIG. 1, the emergency response service must acknowledge the emergency call by returning one or more acknowledgement message ACK1, ACK2 to the initiating system 100 of vehicle 10 within a specified period of time in order to end the search for additional emergency response services. For example, an acknowledgement signal may be used for a fax connection. It may also be provided that an employee of the emergency response service must actively trigger a predefined acknowledgement message. Once the emergency signal EC1, EC2 may have been sent, the receipt of an acknowledgement message ACK1 or ACK2 from the emergency response service corresponding to the first entry 131 or the second entry 132 may be monitored in subsequent sixth step 6. A monitoring period may be limited by a timer. Upon expiry of the timer, the acknowledgement message ACK1, ACK2 may be considered to be "not received". Also a line busy signal may be determined to set the status to "not received". An indication that acknowledgement message ACK1 or ACK2 must be transmitted may be stored for the emergency signal EC1 or EC2.

If no acknowledgement message ACK1 from the emergency response service in the first-priority entry 131 is received in sixth step 6, a further setup of a further connection CON2 to a receiving device of an emergency response service in the second-priority entry 132 may started in seventh step 7. The emergency signal EC2 in the second-priority entry may then be sent, in turn, in again fifth step 5 with new address parameter. If, on the other hand, acknowledgement message ACK1 is received in sixth step 6, the sequence may end in eighth step 8.

Many advantages are achieved by the one embodiment in FIG. 1. When triggering the emergency call, an emergency call control center is not necessary, but instead the closest emergency response service ascertained via the system being responsible for the territory of the emergency situation may be contacted directly. This is advantageous, in particular in emerging and developing countries in which a control center is not provided or not always available. If the system is able to detect what type of emergency situation has occurred (accident, hijacking, fire), it is possible to filter a corresponding emergency response service (hospital, police, fire department) out of the navigation database. An emergency situation may also be clearly signaled over a telephone connection with the aid of a voice file in spoken text in the local language, particularly in other countries, where an internet connection is frequently not provided by an internet provider. After the emergency call signal EC1, EC2 is transmitted, a telephone connection may automatically be established to enable direct communication between the driver and the rescue team.

The emergency response services may be equipped accordingly for direct receipt of the emergency signal. This means that their message receiving device may be able to receive and evaluate corresponding messages. The necessary expenditures to do this are, however, kept within limits, since simple technologies may be used, such as e-mails or SMS (Short Message Service) text messages.

The method according to FIG. 1 may also be used if a control center additionally receives emergency calls. In this case, the control center may receive the emergency call simultaneously in the form of information, together with an indication of which emergency response service is processing the emergency call. The control center may thus continue to perform its coordinating tasks without having to actively intervene. If the emergency signal was sent, for example, to an emergency response service that no longer exists, the control center may respond accordingly.

Figure 2:
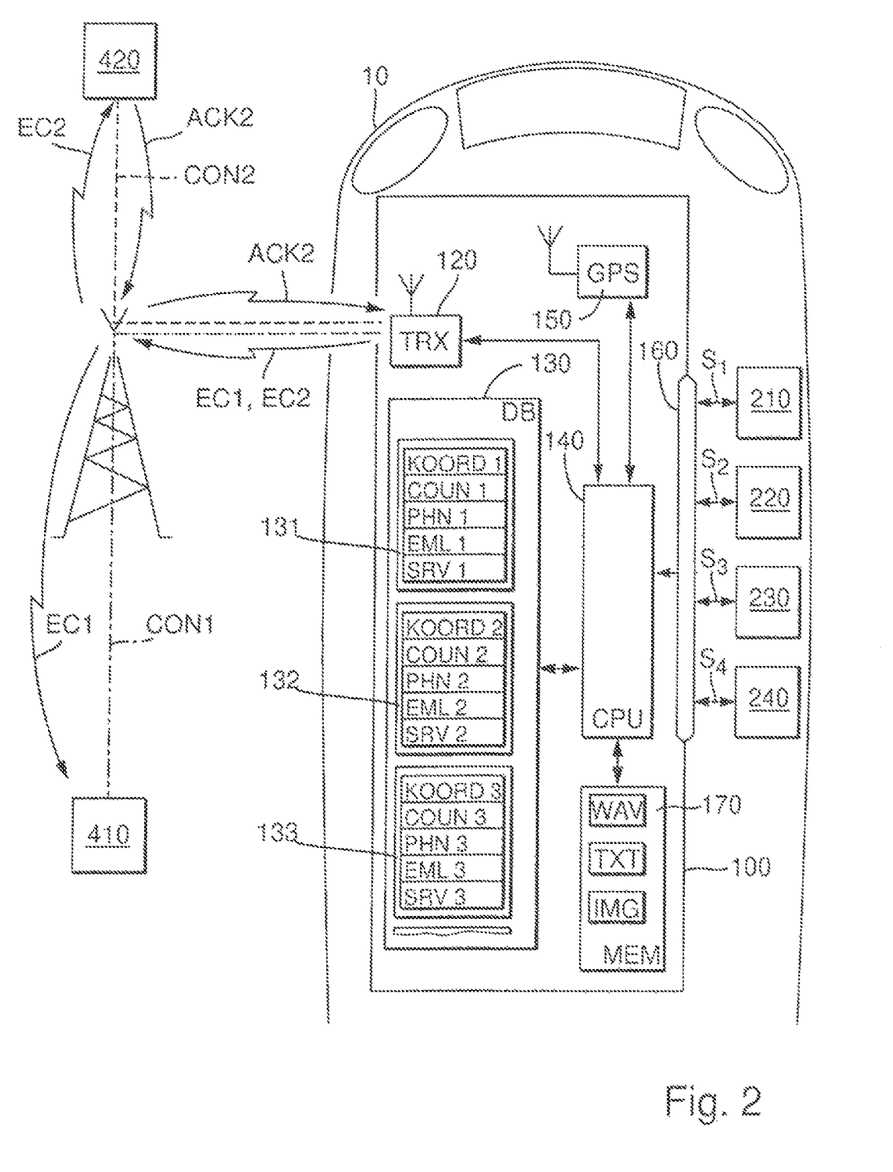
FIG. 2 shows a schematic block diagram which includes a system in a motor vehicle.

A schematic block diagram is shown in FIG. 2. A device 410 of an emergency response service and another device 420 of another emergency response service are illustrated in FIG. 2. FIG. 2 shows a vehicle 10 which includes a system 100 and multiple sensors 210, 220, 230, 240. The sensors are connected to an interface 160 of system 100 in order to evaluate present sensor signals $S_1$, $S_2$, $S_3$, $S_4$ by the system 100. The system 100 and connected sensors 210, 220, 230, 240 permit a detection of an emergency situation. For example, a crash accident may be detected by a crash sensor 210, or a fire in vehicle 10 may be detected by a smoke sensor 220.

The system 100 has a position determining unit 150 for determining a current position POSX of vehicle 10. In the exemplary embodiment in FIG. 2, position determining unit 150 is a satellite receiver (GPS, Glonass, Galileo) for determining the current position POSX of the vehicle 10 with the aid of satellite signals. The system 100 has a database 130 in which entries 131, 132, 133 for emergency response services are present. The database 130 is connected to a processor 140 for retrieving a plurality of entries 131, 132 associated with emergency response services. The processor 140 is also connected via interface 160 to sensors 210, 220, 230, 240 and to position determining unit 150.

The system 100 of vehicle 10 is configured to send an emergency signal EC1, EC2. For the purpose of sending emergency signal EC1, EC2, the system 100 has a transceiver unit 120 which is also connected to the processor 140.

In the exemplary embodiment in FIG. 2, three entries 131, 132, 133 are illustrated schematically by way of example. The plurality includes, for example, only entries 131, 132, while entry 133 is filtered out on the basis of service data SRV3. First entry 131 has a geographic coordinate KOOR1 for the emergency response service, a country identifier COUN1, a telephone number PHN1 and an e-mail address EML as receiving addresses. First entry 131 furthermore has an item of service information SRV1 which includes the services of the emergency response service. Corresponding fields KOORD2, COUN2, PHN2, EML2, SRV2, KOORD3, COUN3, PHN3, EML3, SRV3 are provided for second and third entries 132, 133. One entry may provide more than one service, e.g. one emergency response service may have a fire brigade and an ambulance.

The processor 140 is configured to determine a cost $K_1$, $K_2$ for each entry 131, 132 in the plurality of entries 131, 132. For example, a route from the location KOOR1 of the first emergency response service to current position POSX of the vehicle 10 and an associated cost $K_1$ is determined for this purpose. To determine a minimum $K_{min}$ of the costs, for example all individual costs $K_1$, $K_2$ for the plurality of entries 131, 132 are determined and compared with each other. The processor 140 is configured to ascertain a first-priority entry 131 associated with the minimum $K_{min}$ of costs $K_1$, $K_2$ from among the plurality of entries 131, 132. In the exemplary embodiment of FIG. 2 the first entry 131 is determined being the first-priority entry 131, because of lowest cost $K_1$. The determination of the first-priority entry 131 is initiated by the detection of the emergency situation.

The processor 140 is configured to start the setup of a connection CON1 to device 410 of the emergency response service in the first-priority entry 131 with the aid of a receiving address PHN1, EML1 included in the first-priority entry 131. In the exemplary embodiment in FIG. 2, both a telephone number PHN1 as the receiving address and an e-mail address EML as the receiving address are entered in said entry 131. Thus, both an e-mail and a voice message may be sent as emergency signal EC1. Both may be sent simultaneously or in a prioritized order. The voice message is, for example, a generated audio signal that is output on the basis of determined, current position POSX and road data stored in the system, such as "near the intersection of Monroe Street and Regent Street, Madison, Wis." or "near Mickie's Dairy Bar, Madison."

Emergency messages which are buffered in a memory 170 connected to processor 140 are shown schematically in different formats in the exemplary embodiment in FIG. 2. Thus, an audio voice message WAV and a text message TXT and an image message IMG are shown by way of example. The image message may be generated, for example, by recording an image of the surroundings of vehicle 10 with the aid of a camera.

Transceiver unit 120 is configured to send the emergency signal EC1 over established connection CON1. To prevent emergency calls from going to an outdated emergency response service address, system 100 regularly queries current data for entries 131, 132, 133, e.g., once a day or immediately if no connection capability existed for longer than one day, via available networks (GSM, UMTS, WLAN, LTE, WiMAX, etc.). In the exemplary embodiment in FIG. 2, the update is carried out by processor 140, initiated via transceiver unit 120.

The emergency response service addresses are kept up to date in a central database on a server (not illustrated) which has a corresponding network connection. The participating organizations (Red Cross, Order of Malta, etc.) are responsible for updates on the server. The central database on the server may also be used by each control center for the purpose of determining whether an emergency call was sent to an outdated emergency response service address. An emergency call signal may be selectively sent by system 100, so that assistance may reach the user more quickly in an emergency situation. This also relieves the workload of control centers.

Personal data of the users which is important for the emergency response service, in particular age, required medications, blood group or allergies, may be read by system 100 from the insurance card, personal ID card or comparable cards.

In the exemplary embodiment in FIG. 2, the fact that device 410 of the emergency response service returns an acknowledgement message if emergency call signal EC1 was received, is defined for first-priority entry 131. In the illustrated case, however, an acknowledgement message is not returned. Upon the expiry of a timer of processor 140, a further setup of a further connection CON2 to a device 420 of an emergency response service in second-priority entry 132 is started for sending emergency signal EC2. In this case, an acknowledgement message ACK2 is returned from device 420 of the emergency response service in second-priority entry 132, so that system 100 does not continue looking for a new connection. The second-priority entry 132 is also determined on the basis of cost $K_2$ and is, for example, the second entry 132 having next higher cost $K_2$ compared to the minimum $K_{min}$.

Figure 3:
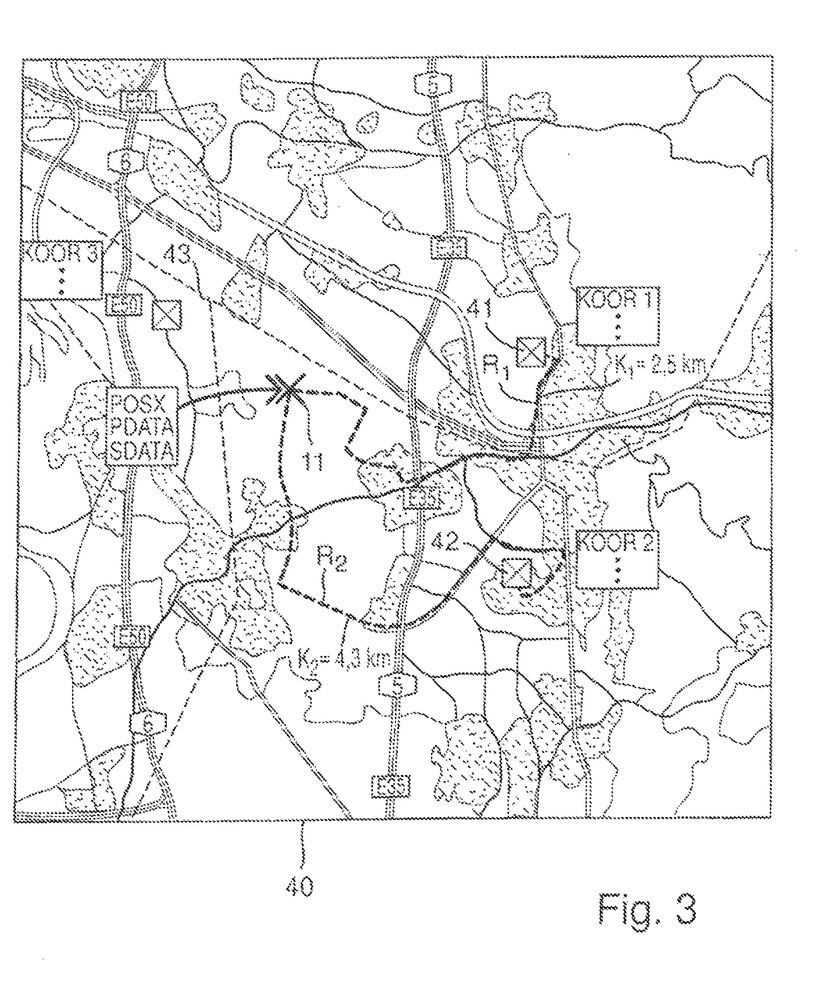
FIG. 3 shows a schematic map representation.

An exemplary embodiment is shown schematically in FIG. 3 with the aid of a map 40. A map of the surroundings of Heidelberg is shown. Symbol 11 shows current position POSX of vehicle 10 on map 40. Emergency response services 41, 42, 43 are also displayed schematically with the aid of symbols. Each emergency response service 41, 42, 43 has its own geographic location KOOR1, KOOR2, and KOOR3, respectively. A plurality of emergency response services 41, 42 is extracted with the aid of filters from the total number of emergency response services 41, 42, 43 on the basis of personal data PDATA of the user and/or on the basis of sensor data SDATA generated from sensor signals $S_1$, $S_2$, $S_3$, $S_4$. A first route $R_1$ is determined for first entry 131 of emergency response service 41, and a second route $R_2$ is determined for a second entry 132 of emergency response service 42, on a road network of map 40. First cost $K_1$ for first route $R_1$ and second cost $K_2$ for second route $R_2$ and a minimum $K_{min}$ of costs $K_1$, $K_2$ are furthermore determined. In the illustrated exemplary embodiment in FIG. 3, a distance of 2.5 km is determined as first cost $K_1$ and a distance of 4.3 km is determined as second cost $K_2$. Accordingly, the minimum is: $K_{min}=2.5$ km$=K_1$. A connection setup to the device of response service 41 is first started according to FIG. 1. Emergency response service 43 has been filtered out, because it has a fire brigade only.

The invention is not limited to the embodiment variants illustrated in FIGS. 1 through 3. For example, it is possible to base the costs on other data. It is also possible to use other emergency signals and other formats. In particular, system 100 according to FIG. 2 is preferably used as part of a navigation system in a motor vehicle 10.

What is claimed:

1. A method performed by a system within a vehicle for automatically sending an emergency call signal, comprising:
   detecting, via a processor included within the system, an emergency situation by evaluating signals of a number of emergency sensors;
   determining, via a position determining unit of the system, a current position of the vehicle; and
   in response to detecting the emergency situation, automatically starting a setup of a connection to a device of an emergency response service by:
   retrieving, via the processor included within the system, a plurality of entries of emergency response services from a database, wherein the plurality of entries is a subset of a superset of entries of emergency response services, and wherein the subset is determined based on the signals of the number of emergency sensors;
   ascertaining, via the processor included within the system, a cost for each entry of the plurality of entries to the current position of the vehicle;

determining, via the processor included within the system, a minimum of costs;

determining, via the processor included within the system, a first-priority entry, wherein the first-priority entry is determined from the minimum of costs;

retrieving, via the processor included within the system, an address included in the first-priority entry for sending the emergency call signal; and starting, via the processor included within the system, the setup of the connection to the device of the emergency response service based on the retrieved address.

2. The method according to claim 1, wherein a route and corresponding cost or flight distance and corresponding cost are calculated for the plurality of entries.

3. The method according to claim 1,
wherein a first route in a road network is determined at least for a first entry, and a second route in the road network is determined for a second entry; and
wherein first cost based on the first route and second cost based on the second route and the minimum of first and second cost are determined.

4. The method according to claim 1, wherein each cost is determined based on a risk factor, the risk factor depending on traffic congestion or transport availability.

5. The method according to claim 1, wherein a signal format of the emergency call signal is determined based on an identifier included in the first-priority entry.

6. The method according to claim 1, wherein the entries of the emergency response services are updated by using a memory or by using a network connection to a server.

7. The method according to claim 1,
wherein a second-priority entry is ascertained;
wherein further address included in the second-priority entry for sending the emergency call signal is retrieved; and
wherein a further setup of a further connection to a further device of emergency response service by using the further address is started if the setup of the connection to the receiving device of the first-priority entry is unsuccessful.

8. The method according to claim 1,
wherein a second-priority entry is ascertained;
wherein further address included in the second-priority entry for sending the emergency call signal is retrieved; and
wherein a further setup of a further connection to a further device of an emergency response service of the second-priority entry by using the further address is started if an acknowledgement message is not received from the device of the emergency response service of the first-priority entry.

9. A system within a vehicle for sending an emergency call signal, comprising:
an interface for connecting a number of emergency sensors for detecting an emergency situation based on signals of the number of emergency sensors,
a position detecting unit for determining a current position of the vehicle,
a database for storing a plurality of entries of emergency response services,
a transceiver unit and
a processor; wherein the processor is configured to, in response to detecting the emergency situation, automatically start a setup of a connection to a device of an emergency response service by:
retrieving the plurality of entries of emergency response services from the database, wherein the plurality of entries is a subset of a superset of entries of emergency response services, and wherein the subset is determined based on the signals of the number of emergency sensors;
determining a cost to the current position for each entry among the plurality of entries;
ascertaining a minimum of costs;
determining a first-priority entry among the plurality of entries from the minimum of costs;
retrieving an address included in the first-priority entry for sending the emergency call signal;
starting the setup of the connection to the device of the emergency response service by using the retrieved address; and
wherein the transceiver unit is configured to send the emergency call signal via the connection.

10. A system within a vehicle for sending an emergency call signal, comprising:
an interface for connecting a number of emergency sensors for detecting an emergency situation based on signals of the number of emergency sensors;
an interface for connecting a position detecting unit for determining a current position of the vehicle;
an interface for connecting to a database containing a plurality of entries of emergency response services;
a transceiver unit; and
a processor; wherein the processor is configured to, in response to detecting the emergency situation, automatically initiating a connection to an emergency response service by:
retrieving the plurality of entries of emergency response services from the database, wherein the plurality of entries is a subset of a superset of entries of emergency response services, and wherein the subset is determined based on the signals of the number of emergency sensors;
for the current position of the vehicle, determining an entry from the plurality of entries having a minimum cost relative to respective costs of other entries of the plurality of entries; and
initiating the connection to the emergency response service corresponding to the determined entry.

11. The method according to claim 1, wherein automatically starting the setup of the connection to the device of the emergency response service is performed without requiring a user input.

* * * * *